United States Patent [19]

Heil et al.

[11] 4,123,270

[45] Oct. 31, 1978

[54] METHOD OF MAKING ELECTROPHOTOGRAPHIC IMAGING ELEMENT

[75] Inventors: Walter P. Heil; David B. Sclove, both of Boulder County, Colo.

[73] Assignee: International Business Machines Corporation, Armonk, N.Y.

[21] Appl. No.: 648,610

[22] Filed: Jan. 12, 1976

Related U.S. Application Data

[63] Continuation-in-part of Ser. No. 613,595, Sep. 15, 1975, abandoned.

[51] Int. Cl.$^2$ .................. G03G 5/06; G03G 5/05
[52] U.S. Cl. .................. 96/1.5 R; 96/1.6; 8/41 R; 8/85 A; 8/172 R; 260/160; 260/176; 260/182; 260/199
[58] Field of Search .................. 96/1.5, 1.6, 99; 8/85 R, 85 A, 172, 94 A; 260/160, 176, 182, 199

[56] References Cited

U.S. PATENT DOCUMENTS

| | | | |
|---|---|---|---|
| 2,828,180 | 3/1958 | Sertoria | 8/94 A |
| 3,384,632 | 5/1968 | Solodar | 96/1.6 |
| 3,549,358 | 12/1970 | Clecak et al. | 96/1.5 X |
| 3,617,270 | 11/1971 | Kampfer et al. | 96/1.7 |
| 3,622,341 | 11/1971 | Lee | 96/1.6 |
| 3,697,595 | 10/1972 | Clecak et al. | 96/1.5 X |
| 3,737,311 | 6/1973 | Wells | 96/1 R |
| 3,824,099 | 7/1974 | Champ et al. | 96/1.5 |
| 3,837,851 | 9/1974 | Shattuck et al. | 96/1.6 X |
| 3,879,200 | 4/1975 | Regensburger et al. | 96/1.5 |
| 3,884,691 | 5/1975 | Rochlitz | 96/1.6 |
| 3,898,084 | 8/1975 | Champ et al. | 96/1.5 |
| 3,925,012 | 12/1975 | Ringel et al. | 8/172 R X |

FOREIGN PATENT DOCUMENTS

| | | | |
|---|---|---|---|
| 1,560,532 | 3/1969 | France | 8/94 A |
| 2,019,321 | 7/1970 | France | 8/94 A |

OTHER PUBLICATIONS

Colour Index, 2nd Ed. 1956, vol. 2, pp. 2815-2816.
Carbide and Carbon Chemicals Co., "Organic Nitrogen Compounds", 1946, pp. 3-5.

*Primary Examiner*—Roland E. Martin, Jr.
*Attorney, Agent, or Firm*—William N. Hogg

[57] ABSTRACT

This invention relates to a method of making an electrophotographic imaging element, the resulting element, and the process of utilizing the element in electrophotographic processes. In its present form the element is generally of the known multi-layered type including a conductive substrate, a layer of charge generating photoconductive material, and a charge transport layer. The charge generating photoconductive layer requires no binder matrix and is comprised primarily of an organic dye material selected from organic primary amine soluble charge generating monoazo and disazo compounds and from organic primary amine soluble charge generating derivatives of squaric acid. The preferred element is produced by dissolving the charge generating material in an organic primary amine solvent or solvent mixture containing an organic primary amine, coating the resulting solution onto a conductive substrate to form a charge generating layer, and then after the solution has dried, overcoating the charge generating layer with a charge transport layer to form an electrophotographic imaging element. In other embodiments polymers or charge transport materials can be incorporated in the solution with the charge generating dye and coated with it to form a composite layer.

18 Claims, No Drawings

METHOD OF MAKING ELECTROPHOTOGRAPHIC IMAGING ELEMENT

CROSS REFERENCE TO RELATED APPLICATION

This application is a continuation-in-part of application Ser. No. 613,595, filed Sept. 15, 1975, now abandoned.

BACKGROUND OF THE INVENTION

1. Field of the Invention

This invention relates in general to electrophotography and more specifically to a novel process for producing an electrophotographic imaging element, the resulting element, and the process of utilizing the element in electrophotography. In particular it is concerned with processes of making an electrophotographic imaging element by dissolving photoconductive charge generating monoazo dye, disazo dye, or derivatives of squaric acid in an organic primary amine or in a solvent mixture containing an organic primary amine and utilizing the solution so formed to solvent coat a photoconductive layer on a conductive substrate.

2. Description of the Prior Art

In the art of electrophotography, an electrophotographic imaging element containing a photoconductive layer is imaged by first uniformly electrostatically charging its surface and then exposing it to a pattern of activating actinic radiation, such as light. Radiation liberates holes and electrons from the photoconductor, causing it to be conductive where irradiated and thus selectively dissipates the charge in the irradiated areas of the photoconductor while leaving behind a charge which represents a latent electrostatic image in the non-irradiated areas. This latent electrostatic image is then developed to form a visible image by, for example, depositing finely divided electroscopic marking particles on the surface of the electrophotographic imaging element, which particles are attracted to the remaining areas of charge.

In practice the electrophotographic imaging element may be a homogeneous layer on a support or it may be a multi-layered structure including a layer of charge generating photoconductive material and layers of other materials. A substantial number of electrophotographic imaging elements including multiple layers are illustrated in the patent literature. For example, U.S. Pat. No. 3,041,166 discloses a layered structure consisting of an inorganic vitreous selenium photoconductor overlaid with an insulating photoconductive polymer. U.S. Pat. No. 3,165,405 discloses a structure designed for reflex imaging utilizing a two-layered zinc oxide-binder structure. U.S. Pat. No. 3,394,001 discloses an electrophotographic element including a conductive substrate carrying a photoconductive material, the photoconductive material being both underlaid and overlaid by an electron donor dye. U.S. Pat. No. 3,573,906 illustrates an electrophotographic element including photoconductive double layers containing an organic, possibly photoconductive insulating layer between the substrate and photoconductive vapor deposited selenium. In U.S. Pat. No. 3,598,582 is described a composite photosensitive device adapted for reflex exposure which employs a layer of organic photoconductive particles arrayed on a supporting substrate and overcoated by a layer of organic charge transport material. More recently many patents have issued which utilize a composite structure consisting of a conductive substrate, a charge generation layer and an organic charge transport layer as taught by U.S. Pat. No. 3,598,582. These include U.S. Pat. No. 3,713,820; 3,725,058; 3,824,099; 3,837,851; 3,839,034; 3,850,630 and 3,898,084. This last list of references can be divided into at least two categories, depending upon whether the charge generating photoconductive material is inorganic or organic. Where inorganic material is utilized it is found to be provided either in the form of particles in a binder matrix or in the form of a continuous film produced, for example, by vapor or vacuum deposition. No examples are known of the dissolution of inorganic materials in a solvent and the coating of the resulting solution onto a support to form a charge generating photoconductive layer. Similarly, with rare exceptions, where the charge generating photoconductive material is an organic compound it is normally dispersed in the form of pigment particles in a matrix binder which are coated in particulate form on a substrate. The known exception is in those instances where the organic photoconductor is itself a thermoplastic polymer capable of dissolution in a wide range of standard hydrocarbon or halogenated solvents, such as in the case of polyvinyl carbazole compounds, and the like. In no instance is the dissolution of an organic coloring material to form a photoconductor known. In the vast majority of organic charge generating material containing electrophotographic elements described in the literature the organic photoconductive material is provided as a layer consisting of discrete particles dispersed in a binder matrix. This is specifically the case as to electrophotographic elements reported in the literature as using coloring materials such as monoazo, disazo, and squaric acid derivative materials.

The utilization of monoazo, disazo, and squaric acid derivative materials in electrophotographic elements appears to be somewhat limited in the patent literature. One known example is U.S. Pat. No. 3,775,105 which describes a technique for enhancing the sensitivity of a photoconductor by the inclusion of milled submicron disazo particles. While the disazo compounds in this patent are milled in a solvent they are not reported as being dissolved, but rather remain as particles. One specific disazo compound reported for use in this manner is chlorodiane blue. U.S. Pat. No. 3,824,099, also noted above as a multi-layered structure, discloses an electrophotographic element including a conductive substrate, a layer of ground squaric acid methine particles in a matrix binder coated onto the substrate, and a charge transport layer of tri-aryl pyrazoline. Again, while the binder dispersion is prepared in a solvent, the squaric acid methine particles are not reported as being dissolved despite the fact that they are referred to as dyes in the patent. Indeed, but for the binder, it appears that the charge generating photoconductive material of this patent could not be adhered to the substrate.

U.S. Pat. No. 3,837,851 teaches another multilayered electrophotographic element including a conductive substrate, a photoconductive charge generating layer, and a charge transport layer of tri-aryl pyrazoline. While most of its charge generating material examples are directed to vapor deposited inorganic compounds, this reference also teaches the use of organic charge generating layers including disazo compounds, phthalocyanine compounds, and squaric acid derivatives. In no instance is the dissolution and solution coating of such organic charge generating materials disclosed by this patent. Finally, U.S. Pat. No. 3,898,084 discloses an electrophotographic element utilizing very small particles of disazo pigment dispersed in a matrix binder as a charge generating layer. Typically the charge generating layer is in the form of photoconductive particles in a binder coated on a conductive substrate. The charge generating layer may be overcoated with a charge transport layer. While many solvents are disclosed for utilization in the milling and coating of the disazo compounds of this patent they are not reported as dissolving the disazo compounds. Therefore, the particles require a binder matrix to fix them to the substrate.

It is thus seen, that while examples of disazo dye, and derivatives of squaric acid have been utilized in electrophotographic elements, no reference is known which discloses how these materials may be dissolved and used to form an electrophotographic imaging element by solution coating. Similarly, it is not suggested in the prior art that, once dissolved, coloring materials of this kind can be coated on a support without the use of a binder matrix.

Other solvents for these monoazo and disazo materials are known or have been earlier discovered and used, for example, for dye recrystallization. See, for example, H. E. Hunziker and R. B. Larrabee, IBM Technical Disclosure Bulletin, Vol. 18, No. 3, August 1975, p. 908. These include sulfuric acid, liquid ammonia and nitrobenzene. However, these materials are so corrosive, or difficult to handle, or provide so little dissolution that their use to dissolve and solution coat photoconductive charge generating coloring materials is not practical. Additionally, because of the corrosive nature of some of these solvents they are difficult to handle and could substantially destroy both the coating system or the substrate upon which the materials are to be coated.

Examples of composite photoconductive structures including polymer or charge transport materials in the same layer as the charge generating material include U.S. Pat. Nos. 3,121,006 and 3,121,007.

It is now considered to be desirable to be able to solution coat charge generating photoconductive materials. Solution coating avoids the requirement of grinding and milling the photoconductive pigment and avoids the use of additional expensive binder material and large volumes of solvent for the binder in order to secure the pigments to the substrate. Other shortcomings in grinding and milling operations are noted below. Normally, grinding or milling requires a great deal of time and can only be carried on one batch at a time. Therefore, in order to prepare a photoconductive layer including ground particles in a binder matrix it is required that batches be prepared discontinuously, or that large capital investments in duplicate grinding equipment be made in order to provide continuous batches of coating material.

Additionally, experience with disazo particles in a binder matrix coated on a substrate and dried have normally resulted in relatively thick coatings having limited photosensitivity. In order to improve photosensitivity the additional step of buffing the surface of the binder-disazo coating has been required. This additional step is not only expensive and time consuming, but it is found to affect the reproducibility of photosensitivity from imaging element to imaging element, and to even affect it at different portions of the same element. By contrast solution coating, with or without a binder, allows fast, continuous dye solution preparation and coating and eliminates the need for batch operations.

Such continuous operation provides simpler and more economical operation with greater reproducibility of coating concentration and thickness, and thus also with greater reproducibility of photosensitivity. Additionally, solution coating affords ease of scale up and the preparation of extremely thin coatings, which require no further treatment, such as buffing, after they have been applied to a substrate.

OBJECTS OF THE INVENTION

It is an object of this invention to provide a novel method for producing an electrophotographic imaging element including a solution coated monoazo, disazo, or derivative of squaric acid charge generating photoconductive material which overcomes the above noted problems.

It is a further object of this invention to provide a method of producing a multi-layered electrophotographic imaging element wherein the charge generating photoconductive material is dissolved in an organic primary amine solvent or in a solvent mixture containing an organic primary amine and solution coated onto a support.

It is also an object of this invention to provide a novel organic primary amine containing solvent system for solution coating chlorodiane blue disazo dye to form a charge generating layer in a layered photoconductor.

It is an additional object of this invention to simplify the method of producing an electrophotographic imaging element by solution coating a charge generating photoconductive coloring material.

It is yet another object to provide a novel electrophotographic imaging element.

Yet another object is to teach a new method of electrophotographic reproduction utilizing a novel imaging element.

SUMMARY OF THE INVENTION

The foregoing objects and others are accomplished in accordance with this invention by dissolving charge generating photoconductive coloring materials of the monoazo, disazo, or derivatives of squaric acid type in one or more organic primary amine containing solvents and coating the resulting solution onto a conductive substrate. The resulting charge generating layer once dry exhibits excellent adhesion to the substrate, and, if desired, can be overcoated with a suitable charge transport layer without any additional treatment of the charge generating layer. The resulting electrophotographic imaging element exhibits good photosensitivity.

In preferred embodiments the electrophotographic imaging element produced by this novel process will normally consist of a conductive substrate, a thin charge generating photoconductive dye layer, and a charge transport overlayer. The charge generating photoconductive layer is comprised primarily of charge generating dyes of the monoazo, disazo, and squaric acid derivative type which are soluble in organic primary amine.

The present invention relies primarily upon both the discovery of the fact that charge generating photoconductive monoazo dyes, disazo dyes, and dervatives of squaric acid are soluble in organic primary amines, and the recognition of the additional fact that once these materials are dissolved they can be solution coated to form a charge generating photoconductive layer in an electrophotographic imaging element.

The foregoing and other objects, features, and advantages of the invention will be apparent from the following more particular description of the preferred embodiments of the invention.

DESCRIPTION OF THE PREFERRED EMBODIMENTS

According to the present invention electrophotographic plates are prepared comprising a substrate, certain selected organic primary amine solution coated charge generating photoconductive material, and, in preferred embodiments, an overcoat of charge transport material.

As noted above the charge generating photoconductive materials are selected from the dye group consisting of certain organic primary amine soluble monoazo compounds, disazo compounds, and squaric acid derivatives.

The monoazo compounds useful in the present invention include those having the structure formula

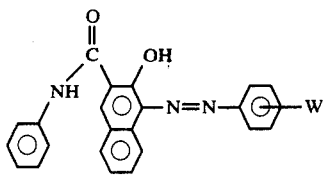

Wherein, W is selected from the group consisting of $NO_2$, CN, Cl, Br, H, $CH_3$, $OCH_3$, $OC_2H_5$, OH, and $N(C_2H_5)_2$.

The disazo compounds useful in the present invention include those having the structural formula

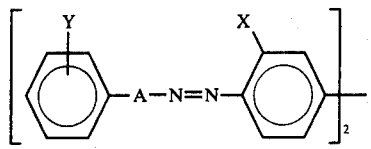

wherein A is selected from the group consisting of:

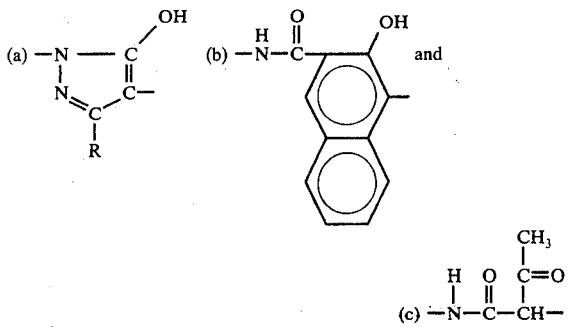

wherein R is selected from the group consisting of lower alkyl and

lower alkyl, and X and Y are each selected from the group consisting of: $NO_2$, CN, H, $CH_3$, $OCH_3$, $OC_2H_5$, OH, Cl, Br, and $N(C_2H_5)_2$; or wherein the said disazo dye has the formula

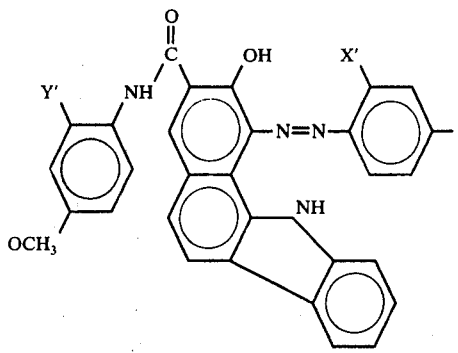

wherein Y' is H or $CH_3$ and X' is H or Cl.

This family of disazo compounds is substantially the same as the taught in U.S. Pat. No. 3,898,084.

Derivatives of squaric acid include those having the formula

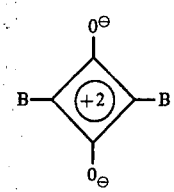

wherein B is selected from the group consisting of

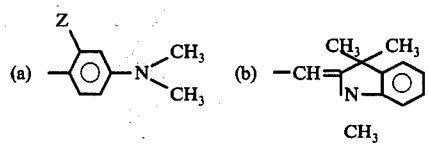

and Z is selected from the group consisting of H, OH and $CH_3$.

It has now been discovered that there are dye compounds selected from the groups disclosed above which are both charge generating and soluble in solvents including one or more organic primary amines.

Compounds of the above formulas may all be prepared by well-known procedures picking the properly substituted starting materials in each case, and carrying out the synthesis by methods in accordance with teachings in the prior art.

It must be emphasized that in the practice of the present invention the dye compounds are dissolved and not present as particles when they are coated on the substrate. Rather they are present in solution. The use of the word dye to describe the materials is in accord with this fact, since in the art the word dye is usually used to describe a colored material which is in solution, as contrasted to the word pigment, which is used to describe a colored particle which is not in solution.

In accordance with the present invention, the dye solution once formed may be used to form a solution coated thin layer on a conductive substrate. In preferred embodiments, the dye layer is overcoated with a charge transport layer. Multi-layered systems of this sort are described in U.S. Patent Application Ser. No. 99,647, filed Dec. 18, 1970, now abandoned, and assigned to the assignee of the present application. More specific examples of such a system, including tri-aryl pyrazoline compounds as an organic charge transport materials in a matrix binder are set forth in U.S. Pat. No. 3,837,851.

As the dyes are normally dissolved without a matrix binder which can serve the charge transport function they normally require a separate charge transport layer. However, the inclusion of varying amounts of solution compatible binders and other materials, including solution compatible charge transport materials is within the comtemplation of the present invention. For reference, such charge transport binders and composite systems are taught, for example, by U.S. Pat. Nos. 3,121,006; 3,121,007; 3,406,063 and 3,484,237.

A few of the dyes useful in the present invention have been listed in the Colour Index published jointly by the Society of Dyers and Colourists in England and the American Association of Textile Chemists and Colorists, Lowell, Massachusetts, U.S.A., 2nd Edition, 1956. In such cases the dyes are referred to below by their Colour Index number, or C.I.

The electrophotographic imaging elements produced in accordance with the present invention include a supporting substrate made up of any suitable conductive material. Typical conductors comprise aluminum, steel, brass or the like. The substrate may be rigid or flexible and of any convenient thickness or width. Typical structures include flexible belts or sleeves, sheets, webs, and rigid plates, cylinders and drums. The substrate or support may also comprise a composite structure such as a thin conductive coating contained on a paper base; plastic coated with a thin conductive layer such as aluminum or copper; or glass coated with a thin conductive coating of chromium or tin oxide.

Where the structure includes a charge transport material, in the form of an overlayer, any suitable transparent material may be used which is capable of supporting the injection of photo-excited carriers, in the form of holes or electrons, from the charge generating photoconductive layer and allowing the transport of these carriers through the charge transport material to selectively discharge a charge at the surface of the imaging element. The primary requirement is that the transport material, if it is an overlayer, must be substantially transparent in the wavelength region to which the electrophotographic imaging element will be exposed. The active transport material can be either an electron or hole transport depending upon the distinctive nature and effectiveness of the charge generating photoconductive material and the corona charge on the surface of the imaging element. Typical art known hole transport materials include carbazole, N-ethyl carbazole, N-isopropyl carbazole, N-phenylcarbazole, tetraphenylpyrene, 1-methylpyrene, perylene, chrysene, anthracene, tetracene, 2-phenyl naphthalene, azapyrene, fluorene, fluorenone, 1-ethylpyrene, acetyl pyrene, 2,3-benzochrysene, 3,4-benzopyrene, 1,4-dibromopyrene, phenyl indole, polyvinyl carbazole, polyvinyl pyrene, polyvinyl tetracene, polyvinyl perylene, and tri-aryl pyrazoline. Suitable electron transport materials include 2,4,7-trinitro-9-fluorenone (TNF), 3,4,5,7-tetranitro-9-fluorenone, dinitroanthracene, dinitroacridine, tetracyanopyrene, and dinitroanthraquinone. Most often these charge transport materials are dispersed in a suitable polymeric binder before coating.

Additionally, any polymer which contains a moiety including the appropriate aromatic or heterocyclic charge carrier transport such as carbazole, tetracene, pyrene, or 2,4,7-trinitro-9-fluorenone, for example, will function as an active transport material. Polyesters, polysiloxanes, polyamides, polyurethanes, and epoxides, as well as block, random or graft copolymers (containing the aromatic moiety) are exemplary of the various types of polymers which could be employed as transport material. It is not the intent of this invention to restrict the type of charge transport material or polymer which can be employed as the transport material.

The thickness of the charge transport layer is not normally critical to the function of the electrophotographic member. However, the thickness of the charge transport layer may be dictated by practical needs in terms of the amounts of electrostatic charge necessary to induce an applied field suitable to effect hole or electron injection and transport. Transport layer thicknesses of from about 5 to 100 microns are generally suitable, but thicknesses outside of this range may be used. The ratio of the thickness of the transport layer to the photoconductor layer does not appear to be critical.

Where the charge transport layer is overlaid between the source of radiation and the charge generating layer the transparency of the charge transport layer must be of such a character as to allow a sufficient amount of radiation to pass through the charge transport layer, to allow the photoconductive layer, to function in its capacity as a charge generator.

It is not the intent of this invention to in any way restrict the choice of charge transport materials to those which are transparent in the entire visible region. For example, when a layered structure is used with a transparent substrate, exposure may be accomplished through the substrate without light being required to pass through the layer of charge transport material. In this case the charge transport layer need not be nonabsorbing (transparent) in the wavelength region of use. Other applications where complete transparency is not required of the charge transport material include the use of the electrophotographic element for the selective recording of narrowband radiation such as that emitted from lasers. While the charge transport layer may consist exclusively of charge transport material, for purposes of the present invention, the layer may also comprise the charge transport material dispersed in a suitable binder which with the transport material permits effective dissipation of holes or electrons from the charge generating dyes of the instant invention through the transport layer. Typical resin binder materials for the charge transport material which may be used in the present invention are polystyrene, silicone resin, polycarbonate, acrylic and methacrylic ester polymers, polymerized ester derivatives of acrylic and alpha-acrylic acids, polymerized butyl methacrylates, chlorinated rubber, vinyl polymers and copolymers such as polyvinyl chloride, and polyvinyl acetate, cellulose esters and ethers such as ethyl cellulose, nitrocellulose, and alkyd resins. In addition, mixtures of such resins with each other or with plasticizers so as to improve adhesion, flexibility, and blocking of the coatings may be used. Particularly novel mixtures of binder materials comprising an acrylic resin and a polycarbonate for use in conjunction with a tri-aryl pyrazoline in a charge transport layer of a layered photoconductor are disclosed in U.S. Patent Application Ser. No. 639,795, now U.S. Pat. No. 4,030,923 filed on Dec. 11, 1975, assigned to the assignee of the instant application.

In most cases, where the charge transport material is a separate overlayer it serves not only as a charge carrier, but also protects the photoconductive layer from abrasion and chemical attack and it therefore extends the operating life of the electrophotographic imaging element.

In the practice of the present invention, the thickness of the photoconductive charge generating layer may be about 0.025 to 0.50 micron, although thicknesses outside of this range can also be used. As already noted there is no required ratio between the thickness of the charge generating layer and the thickness of the charge transport layer although the charge transport layer will normally be substantially thicker due to its binder matrix.

In one modification the electrophotographic element prepared in accordance with the present invention may be modified by coating the substrate with an adhesive or polymeric layer prior to solution coating the charge generating photoconductive material. While such an adhesive or polymeric layer is not normally required to secure the dye to the substrate, in some instances it is useful in enhancing both the adhesion and the uniformity of the dye coating. Where such an adhesive or polymeric precoat is utilized it is of such a character and thickness that is does not prevent the flow of charge between the charge generating layer and the conductive substrate.

As used herein the term "organic primary amine containing solvent" is characterized by the presence of a component having a formula $R(NH_2)_n$ wherein R is an organic radical and n is 1, 2 or 3. It is thus also clear that organic primary diamines are suitable for use in the practice of the present invention and as such are intended to be included in the definition of "organic primary amine containing solvent". Generally, the solubility of the charge generating photoconductive dyes utilized in the present invention decreases as the number of carbons in the radical R of the amine increases. The term "organic primary amine containing solvent" also includes single amines, or mixed amines and solutions containing other organic solvents in addition to one or more organic primary amines. While the inclusion of other organic solvents is found to reduce the total solubility of the dyes in solution, the use of other solvents is sometimes beneficial. For example, additional solvents are useful in controlling drying time and coating smoothness.

It has also been discovered surprisingly, that when the photoconductive material chlorodiane blue, disazo dye, is dissolved in a solvent mixture comprising tetrahydrofuran, ethylenediamine and n-butylamine, and thereafter solution coated to form a charge generating layer, there results a particularly good uniform and dense layer which is substantially without voids or patterns. Further, the solvent mixture containing tetrahydrofuran/ethylenediamine/n-butylamine and chlorodiane blue was found to remain stable over a long period of time without the precipitation of the chlorodiane blue pigment so as to greatly improve the practical usefulness of such charge generating material containing solvent mixtures as regards storage and shelf life.

While the said chlorodiane blue disazo dye and the tetrahydrofuran, ethylenediamine and n-butylamine forming the solvent mixture of the instant invention may be admixed together in any relative amounts to yield good charge generating coatings, it has been found, however, that particularly good charge generating photoconductive coatings are obtained when the solvent mixture comprises about 30–60%, by weight, tetrahydrofuran, 10–40%, by weight, ethylenediamine and 10–40%, by weight, n-butylamine. It is preferred that the relative amounts be about 2 parts, by weight, tetrahydrofuran, 1 part, by volume, ethylenediamine and 1 part, by volume, n-butylamine, which corresponds to a preferred relative amount of about 55%, by weight, tetrahydrofuran, 25% by weight, ethylenediamine and 20%, by weight, n-butylamine.

It has also been found preferable in admixing the chlorodiane blue disazo dye and the tetrahydrofuran, ethylenediamine and n-butylamine forming the solvent mixture of the instant invention that the chlorodiane blue disazo dye should be first admixed with ethylenediamine to fully dissolve the dye. Thereafter, n-butylamine should be added followed by the addition of tetrahydrofuran.

Further, while the amount of chlorodiane blue relative to the tetrahydrofuran/ethylenediamine/n-butylamine solvent mixture is not critical, it has been found preferable for the sake of optimum use of the components of the solution, and taking into account the relative solubility of the dye that the final solution contain about 0.5%, by weight, of the chlorodiane blue.

Also, if desired, a wetting agent may be incorporated in the solution and any of the well known and suitable wetting agents may be so added, as for example, silicone oils. Although the wetting agent may be added in any suitable amount, this being easily determined by one skilled in the art, it has been found advantageous to add about 0.5%, by weight, of wetting agent based upon the weight of chlorodiane blue disazo dye.

As used through this application, and unless otherwise indicated, where ratios are indicated, the ratios are in term of volume. For reasons of functional utility amines which are liquid at ambient temperatures are preferred in the practice of the present invention.

EXAMPLE 1

The dye used in this example is called "chlorodiane blue". The synthesis of chlorodiane blue, generally hereinafter "CDB", is set forth, for example in U.S. Pat. No. 3,898,084, and is incorporated herein by reference. The structure of CDB is shown below, correlated with this example number.

In this example a 0.5%, by weight, solution of CDB was prepared in a solvent solution of 1:1, by volume, methylamine/n-butylamine. The resulting solution was coated by means of a meniscus coater onto the aluminized polyethylene terephthalate web. The resulting coating exhibited excellent adhesion to the substrate and without any further treatment was overcoated with a charge transport layer of DEASP tri-aryl pyrazoline in Vitel PE-200 polyester, from Goodyear Tire and Rubber Co. DEASP is an abbreviation for charge transport material more properly designated as 1-phenyl-3-(p-diethylaminostryryl)-5-(p-diethylaminophenyl)-pyrazoline. The resulting electrophotographic imaging element exhibited good photo sensitivity and utility as an electrophotographic imaging element. When dark charged to $-700$ v the element required 1.1 microjoules/cm$^2$ to discharge to a charge of $-200$ v.

Chlorodiane blue shows excellent characteristics as a charge generating photoconductive material and is the preferred dye for use in this invention. Therefore efforts were made to determine the solubility of CDB in various organic primary amines, diamines, amine mixtures and mixtures of amines and other solvents. The results of that study are set forth in TABLE I. Note, that while liquid ammonia does not constitute an organic primary amine, within the meaning of the present invention, its utility as a solvent has been determined and is set forth in the table as a matter of information. The use of ammonia as a solvent in the practice of this inventon is not specifically claimed.

TABLE I
SOLVENT SYSTEMS FOR CDB

| Solvent | Solubility of CDB |
|---|---|
| Liquid Ammonia | 1.5 g/l |
| Methylamine | 50 g/l |
| 4:1 Dimethyl Formamide/Methylamine | 80 g/l |
| Ethylamine | > 10 g/l < 20 g/l |
| 1:1 Methylamine/Butylamine | 75 g/l |
| 1:1 Ethylamine/Tetrahydrofuran | 5 g/l |
| Ethylenediamine | 180 g/l |
| n-Butylamine | s |
| Diethylenetraimine | s |
| Isopropylamine | s |
| t-Butylamine | s | s — soluble, but maximum solubility not determined

EXAMPLE 2

CDB was dissolved in ethylenediamine to form a 1.5% solution, by weight. The resulting solution was then meniscus coated onto the aluminum surface of a web of aluminized polyethylene terephthalate and dried to form a continuous coating of CDB. The dry weight of the dye was determined to be about 0.1 mg/in$^2$. This solution coated dye was then overcoated with DEASP, as in EXAMPLE 1. The resulting article was found to be suitable for use as an electrophotographic imaging element including sensitivity of a degree such that when dark charged to $-700$ v by corona discharge and then irradiated with a photocopy green (PCG) lamp, the element required 0.65 microjoules/cm$^2$ to discharge to a charge of $-200$ v.

EXAMPLES 3-7

As shown in TABLE II below, a series of related disazo dyes were dissolved in primary amine solvents, as noted. In each instance the resulting solution was coated on a substrate of conductive aluminized polyethylene terephthalate and overcoated with a charge transport material. The sensitivity for each resulting electrophotographic imaging element in terms of discharge from $-700$ v to $-22$ v, or "$E_{200}^{700}$", is also shown in TABLE II, where available. In each instance the element was found to have utility for electrophotographic imaging.

TABLE II

| Example | Disazo Dye | Solvent | Sensitivity |
|---|---|---|---|
| 3 | Disazo Dye from Naphthol-AS-SR & Dichlorobenzidine | 3:1 ethylamine/ethylenediamine | 3.93 microjoules/cm$^2$ |
| 4 | Disazo Dye from Naphthol-AS-SR & Benzidine | 3:1 ethylamine/ethylenediamine | 2.44 microjoules/cm$^2$ |
| 5 | Disazo Dye from Naphthol-AS-SG & Benzidine | 3:1 ethylamine/ethylenediamine | — |
| 6 | Disazo Dye from Naphthol-AS-SG & Dichlorobenzidine | 3:1 ethylamine/ethylenediamine | — |
| 7 | Electra Red | 3:1 ethylamine/ethylenediamine | — |

The structures and, where available, colour index number, for each disazo dye example is correlated with the example number(s) and is set forth below:

EXAMPLES 1 and 2

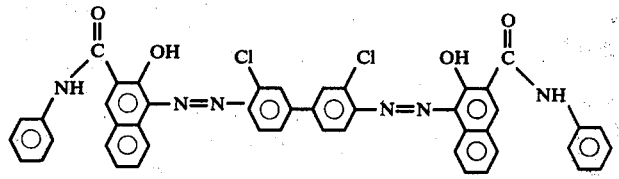

EXAMPLE 6

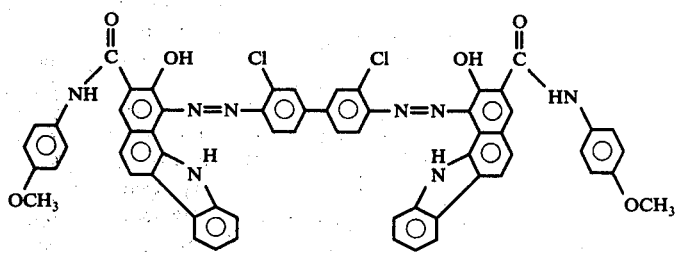

EXAMPLE 5

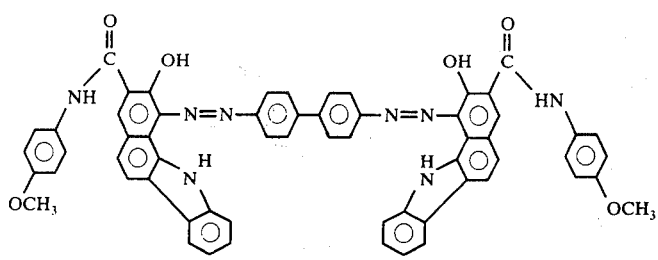

EXAMPLE 4

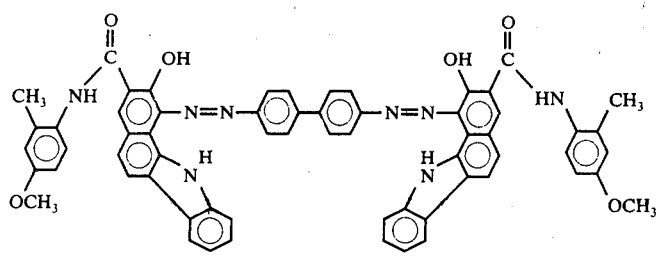

EXAMPLE 3

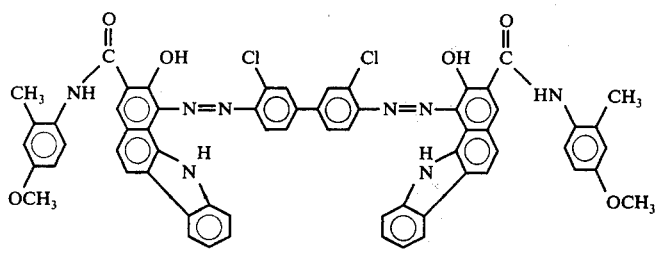

EXAMPLE 7

Color Index Number 21200

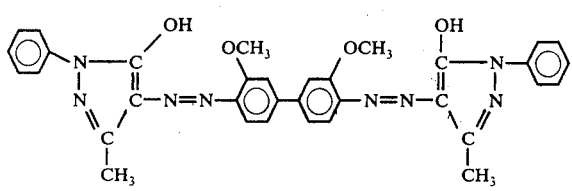

EXAMPLES 8-16

A family of monoazo dyes was prepared, as shown in further detail below. Each dye was utilized to prepare an electrophotographic imaging element in accordance with the teaching of the present invention. In each instance the monoazo dye was dissolved in n-butylamine at a given weight percent of solution and coated to a dry weight onto aluminized polyethylene terephthalate as shown in TABLE III below. In each example 0.25%, by weight of the monoazo dye, of DC-200 dimethyl silicone oil from the Dow Corning Corporation was added to the dye solution as a leveling or wetting agent. In each example the resulting solution coated dye, when dry, was overcoated with a charge transport layer consisting of a 9:1 mixture of Mobay Chemical Co. M-60 polycarbonate and Vitel PE-200 polyester with DEASP. The ratio of the polymer mixture to DEASP was 1.5:1, with the resulting charge transport solution being coated to a dry weight of 20 mg/in$^2$. In each Example 8-16 the resulting article was found to be useful as an electrophotographic imaging element.

TABLE III

| Ex. | Monoazo dye | Weight % dye in solution | Coated weight in mg/in$^2$ | $\Delta v$, in volts |
|---|---|---|---|---|
| 8 | 1-(p-nitrophenylazo) 2-hydroxy-3-naphthanilide | 3.0 | 0.44 | 155 |
| 9 | 1-(p-cyanophenylazo)- 2-hydroxy-3-naphthanilide | 10.0 | 0.43 | .63 |
| 10 | 1-(p-chlorophenylazo)- 2-hydroxy-naphthanilide | 7.5 | 0.22 | 45 |
| 11 | 1-phenylazo-2-hydroxy- 3-naphthanilide | 3.3 | 0.13 | 56 |
| 12 | 1-(p-methylphenylazo)- 2-hydroxy-3-naphthanilide | 7.5 | 0.26 | 24 |
| 13 | 1-(p-methoxyphenylazo)- 2-hydroxy-3-naphthanilide | 7.5 | 0.28 | 5 |
| 14 | 1-(p-hydroxyphenylazo) 2-hydroxy-3-naphthanilide | 1.0 | 0.08 | 45 |
| 15 | 1-(p-diethylaminophenylazo)- 2-hydroxy-3-naphthanilide | 10.0 | 0.20 | 0 to 1 |
| 16 | 1-(o-chlorophenylazo)- 2-hydroxy-3-naphthanilide | 7.5 | 0.22 | — |

$\Delta v$, as shown in TABLE III, is indicative of sensitivity. In determining $\Delta v$ the electrophotographic imaging element was charged to approximately $2.3 \times 10^5$ v/cm and discharged with light having a wavelength of 5500Å in the form of a fixed pulse of approximately 4.0 microjoules/cm$^2$. The resulting voltage change after exposure, $\Delta v$, was measured, corrected for dark decay, and is set forth in TABLE III.

EXAMPLES 17-24

This series of examples uses most of the same monoazo dyes used in EXAMPLES 8-16. Again, the monoazo dyes were dissolved in n-butylamine at a given weight percent of solution, with the addition of 0.25% by weight of the monoazo dye, of DC-200 added as a leveling or wetting agent. Each resulting solution was then meniscus coated on the conductive surface of a web of aluminized polyethylene terephthalate to the dry weight shown in TABLE IV. Each solution coated dye when dry was then vacuum overcoated with about 8 microns of DEASP. In each example the electrophotographic imaging element was then charged to approximately $2.3 \times 10^5$ v/cm and discharged with light having a wavelength of 5500Å and a fixed pulse of about 8.0 microjoules/cm$^2$. The voltage change, $\Delta v$, after correction for dark decay was then normalized using the formula $$\text{"normalized } \Delta v = \frac{\Delta v/v \times 100}{8.0 \text{ microjoules/cm}^2} \text{" and}$$

is set forth in TABLE IV. Data on dark decay is also set forth in the table.

TABLE IV

| Example | Monoazo Dye | Weight % dye in solution | Coated weight, in mg/in² | Normalized Δv | Dark Decay in v/sec. |
|---|---|---|---|---|---|
| 17 | 1-(p-nitrophenylazo)-2-hydroxy-3-naphthanilide | 3.0 | 0.44 | 2.6 | 0.8 |
| 18 | 1-(p-cyanophenylazo)-2-hydroxy-3-naphthanilide | 10.0 | 0.45 | 5.0 | 0.8 |
| 19 | 1-phenylazo-2-hydroxy-3-naphthanilide | 3.3 | 0.13 | 10.4 | 1.0 |
| 20 | 1-(p-chlorophenylazo)-2-hydroxy-3-naphthanilide | 7.5 | 0.22 | 7.0 | 0.8 |
| 21 | 1-(p-methylphenylazo)-2-hydroxy-3-naphthanilide | 7.5 | 0.26 | 5.7 | 0.8 |
| 22 | 1-(p-hydroxyphenylazo)-2-hydroxy-3-naphthanilide | 1.0 | 0.08 | 4.8 | 3.5 |
| 23 | 1-(p-methoxyphenylazo)-2-hydroxy-3-naphthanilide | 7.5 | 0.28 | 3.2 | 0.8 |
| 24 | 1-(p-diethylaminophenylazo)-2-hydroxy-3-naphthanilide | 10.0 | 0.20 | 3.5 | 3.0 |

The structure for each monoazo dye in examples 8-24 is correlated with the example numbers and is set forth below:

EXAMPLES 8 and 17

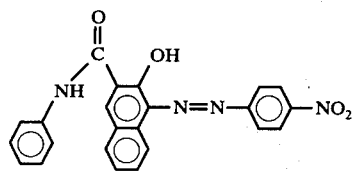

EXAMPLES 9 and 18

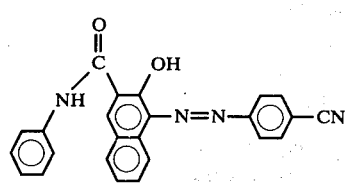

EXAMPLES 10 and 20

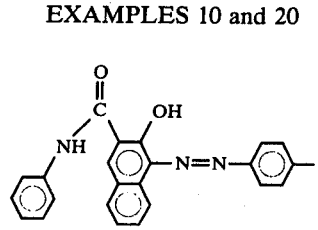

EXAMPLES 11 and 19

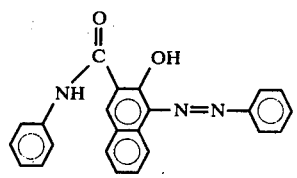

EXAMPLES 12 and 21

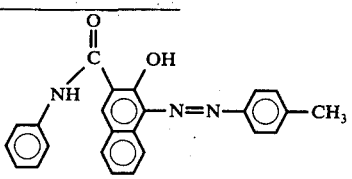

EXAMPLES 13 and 23

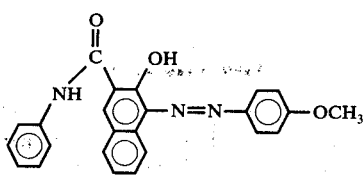

EXAMPLES 14 and 22

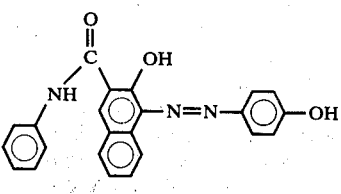

EXAMPLES 15 and 24

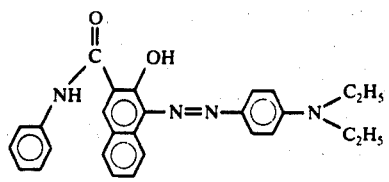

EXAMPLE 16 Color Index number 12300

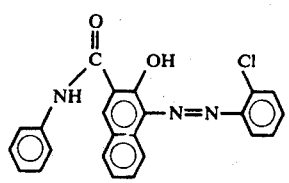

EXAMPLE 25

A sample of methyl squarylium, more properly designated as 2,4-bis-(2-methyl-4-dimethylamino-phenyl)-1,3-cyclobutadiene-diylium-1,3-diolate, was procured. This dye derivative of squaric acid was then dissolved in a 1:1 solution of ethylamine/n-butylamine solvents to produce a 0.5%, by weight, a dye solution. The resulting solution was then meniscus coated at a speed of 5 feet/minute on the conductive surface of a web of aluminized polyethylene terephthalate. After drying, the solution coated dye was overcoated with a 2:1 mixture of Vitel PE-200 polyester and DEASP to a thickness of about 20 microns. When the resulting article was dark charged to −700 v it was found to require 1.1 microjoules/cm$^2$ of PCG light to discharge to a charge of −200 v. The article was found to be suitable for use as an electrophotographic imaging element. The structure of the squaric acid derivative dye utilized in this example is

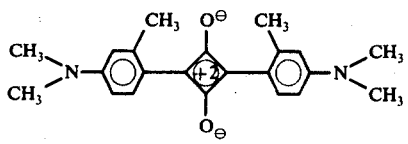

EXAMPLE 26

A squaric acid derivative dye in the form of hydroxy squarylium, more properly designated as 2-4-bis-(2-hydroxy-4-dimethylamino-phenyl)-1,3-cyclobutadiene-diylium-1,3-diolate, was prepared. This dye derivative of squaric acid was dissolved in a 1:5:24 mixture of ethylenediamine/n-propylamine/tetraydrofuran to form a 3.3%, by weight, dye solution. As in the previous example, the dye solution was moniscus coated on aluminized polyethylene terephthalate to provide a coating having a dry weight of about 0.06 mg/in$^2$. The dry coating was then overcoated with a charge transport layer of a 1:1 mixture of DEASP and Mobay M-60 polycarbonate, the charge transport layer having a dry weight of about 15 mg/in$^2$. When the resulting article was dark charged to −800 v is was found to require 0.43 microjoules/cm$^2$ to discharge to −190 v. As such, the article was well suited for use as an electrophotographic imaging element.

The squaric acid derivative dye utilized in this example has a structure of

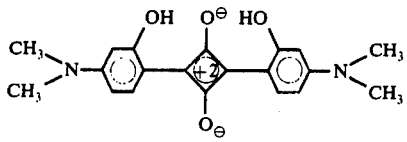

EXAMPLES 27 and 28

Two additional squaric acid derivative dyes were obtained and determined to be soluble in organic primary amine containing solvents. The first was 2,4-bis-(2,3,3-trimethyl-2-indolinylidenemethyl)-1,3-cyclobutadiene-diylium-1,3-diolate having a structure of

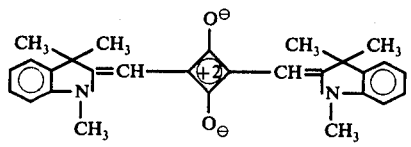

The second was 2,4-bis-(p-dimethylaminophenyl)-1,3-cyclobutadiene-diylium-1,3-diolate having a structure of

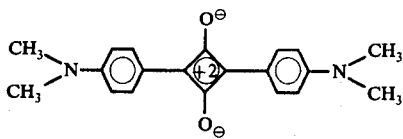

Both of these squaric acid derivative dyes were dissolved in ethylenediamine and coated on an aluminized web of polyethylene terephthalate. They are believed to be suitable for use in the preparation of electrophotographic imaging elements.

EXAMPLE 29

In one preferred embodiment an electrophotographic imaging element was prepared utilizing the disazo dye chlorodiane blue (CDB). The electrophotographic element prepared was in the form of a layered structure formed by sequential coatings onto a substrate. The substrate was 3 mil polyethylene terephthalate with an aluminum coating on one surface to provide a conductive substrate. A polyester adhesive material was overcoated on the aluminum surface of the conductive substrate. Overlying and coated onto the adhesive layer was a charge generation layer of chlorodiane blue dye, coated from a 0.5% by weight, dye solution in 2:1:1 tetrahydrofuran (by weight)/ethylenediamine (by volume)/n-butylamine (by volume). This corresponds to a solvent ratio of about 55% by weight tetrahydrofuran, 25% by weight ethylenediamine and 20% by weight n-butylamine based on a specific gravity of 0.90 for ethylenediamine and 0.739 for n-butylamine. The charge generation coating solution of CDB was prepared and coated as follows. To a four-liter resin kettle fitted with a stainless steel stirrer, was added 15.0 grams of chlorodiane blue (CDB) and 756 ml. of reagent grade (93%) ethylenediamine. The solution was stirred until the CDB was completely dissolved. Then 750 ml. of reagent grade n-butylamine was added while stirring was continued. This was followed by the addition of 42 grams of 1% DC-200 silicone oil in tetrahydrofuran (THF) and 1458 grams of THF, also with stirring.

The resulting solution was added to a slot-head coating assembly and coated onto the adhesive coated substrate and then oven dried. Onto the exposed surface of the CDB layer was then coated a layer approximately 20 microns thick of 1:1 ratio by weight of DEASP mixed with M-60 polycarbonate.

The aluminized substrate provides support and electroconductivity for a ground plane to bleed off charge conducted to it by the rest of the structure. The adhesive layer provides a bonding agent between the aluminum layer and the charge generation CDB dye material. When CDB is struck by photons of light, holes and electrons are generated in the dye layer. The holes are injected into the DEASP charge transport layer and the electrons tunnel through the adhesive material to the aluminum layer and are conducted away to ground. In the structure taught by this example the DEASP charge transport layer is suited for transporting holes to the surface of the electrophotographic imaging element.

In operation, a charge generated by a corona is deposited on the exterior surface of the electrophotographic imaging element. In this example the corona charge is negative, or in the form of electrons. Holes and electrons are generated in the CDB by the action of the photons upon the dye. The holes are transported through the charge transport layer to the surface of the imaging element where they combine with electrons, neutralizing each other, and eliminating portions of the charge at the surface. DEASP by its nature is well suited for transporting holes, but does not readily transport electrons. The DEASP charge transport layer is essentially transparent to light in the visible range. Therefore, almost all of the light impinging on the surface of the photoconductor is transmitted through the charge transport layer to cause the CDB dye charge generation material to efficiently generate holes and electrons in response to light exposure.

EXAMPLES 30-38

Example 29 was repeated at various tetrahydrofuran, ethylenediamine and n-butylamine mixture ratios together with various amounts of CDB charge generating material as well as various amounts of DC-200 wetting agent. Using each of the solutions to form a charge generating layer as described in Example 29, it was observed that in each instance there resulted a flawless coating having good electrical sensitivity and having substantially no voids or patterns to adversely affect photocopies. The relative amounts of tetrahydrofuran (THF), ethylenediamine (EDA), n-butylamine (BA), DC-200 and CDB, expressed in weight percent, as well as the resulting charge generating coat are set forth below in TABLE V.

TABLE V

| Example | THF | EDA | BA | DC-200 | CDB | Coat Formed |
|---|---|---|---|---|---|---|
| 30 | 55.56 | 23.81 | 19.55 | .0026 | 1.05 | Good |
| 31 | 54.36 | 24.46 | 20.08 | — | 1.08 | Good |
| 32 | 54.60 | 24.59 | 20.19 | — | .54 | Good |
| 33 | 29.25 | 26.00 | 43.24 | — | 1.17 | Good |
| 34 | 54.64 | 24.59 | 20.19 | .013 | .54 | Good |
| 35 | 49.45 | 14.40 | 35.60 | .013 | .48 | Good |
| 36 | 30.94 | 25.80 | 42.37 | .022 | .86 | Good |
| 37 | 38.93 | 33.06 | 27.93 | .022 | .82 | Good |
| 38 | 54.63 | 24.50 | 20.19 | .021 | .55 | Good |

EXAMPLES 39-52

Example 29 was repeated in the manner of Examples 30 to 38 except that now various polymeric binder materials were incorporated in the charge generating layer and again it was observed that similarly good coatings were obtained. The binder materials employed were polyester resins Vitel PE-200 and Vitel PE-207, sold by the Goodyear Company, a polyvinyl formal sold under the tradename Formvar 795-E by the Monsanto Company, and acrylic resins B-76, B-82 and WR-97 sold by the Rohm & Haas Company. The relative amounts of tetrahydrofuran (THF), ethylenediamine (EDA), n-butylamine (BA), DC-200, CDB as well as the amount and particular binder material used are all expressed as percent, as well as the resulting charge generating coat, are set forth below in TABLE VI.

TABLE VI

| Ex. | THF | EDA | BA | DC-200 | CDB | Coat Binder | Formed |
|---|---|---|---|---|---|---|---|
| 39 | 54.45 | 24.51 | 20.12 | .02 | .54 | .32 PE-200 | Good |
| 40 | 54.45 | 24.51 | 20.12 | .02 | .32 | .54 PE-200 | Good |
| 41 | 54.45 | 24.51 | 20.12 | .02 | .54 | .32 795-PE | Good |
| 42 | 54.45 | 24.51 | 20.12 | .02 | .32 | .54 795-E | Good |
| 43 | 54.45 | 24.51 | 20.12 | .02 | .54 | .32 PE-207 | Good |
| 44 | 54.45 | 24.51 | 20.12 | .02 | .32 | .54 PE-207 | Good |
| 45 | 54.45 | 24.51 | 20.12 | .02 | .54 | .32 B-76 | Good |
| 46 | 54.45 | 24.51 | 20.12 | .02 | .32 | .54 B-76 | Good |
| 47 | 54.62 | 24.62 | 20.21 | .02 | .43 | .11 PE-200 | Good |
| 48 | 54.62 | 24.62 | 20.21 | .02 | .32 | .21 PE-200 | Good |
| 49 | 54.62 | 24.62 | 20.21 | .02 | .43 | .11 WR-97 | Good |
| 50 | 54.62 | 24.62 | 20.21 | .02 | .32 | .21 WR-97 | Good |
| 51 | 54.62 | 24.62 | 20.21 | .02 | .43 | .11 B-82 | Good |
| 52 | 54.62 | 24.62 | 20.21 | .02 | .32 | .21 B-82 | Good |

EXAMPLES 53-57

By way of comparison, various charge generating solutions were prepared and coated as in Example 29 except that the solvent mixture consisted of only two solvents or only one solvent, i.e., either ethylenediamine together with toluene, or ethylenediamine alone. In each instance the resulting charge generating layer was shown to be relatively less satisfactory for solution coating CDB. The relative amounts of tetrahydrofuran (THF), ethylenediamine (EDA), n-butylamine (BA), toluene (TOL), and CDB, expressed in weight percent, as well as the resulting charge generating coat, are set forth below in TABLE VII.

TABLE VII

| Example | THF | EDA | BA | TOL | CDB | Coat Formed |
|---|---|---|---|---|---|---|
| 53 | — | 76.70 | — | 22.14 | 1.11 | CDB ppct. |
| 54 | 22.57 | 76.32 | — | — | 1.10 | poor adhesion |
| 55 | 66.00 | 33.50 | — | — | .48 | poor coating |
| 56 | — | 84.50 | — | 14.3 | 1.15 | poor coating |
| 57 | — | 98.90 | — | — | 1.09 | poor coating |

EXAMPLE 58

In an effort to improve the physical integrity of the electrophotographic imaging elements described in the previous examples, and to determine whether polymer binder could be incorporated into the charge generation layer by dissolution in the charge generation solution the following electrophotographic element was prepared. Into a mixture of 1 ml of ethylenediamine and 5 ml of n-propylamine was added 700 mg of hydroxy squarylium (of the type used in Example 26) and 300 mg of methyl squarylium (of the type used in Example 25). Following dissolution of the mixed dyes a polymer solution of 222 mg of Elvacite 2010 acrylic resin, from E. I. duPont de Nemours & Co., dissolved in 24 ml of THF was added and found to be mutually compatible. The dye-polymer solution was then meniscus coated on a conductive substrate to a dry weight of about 0.050 mg/in². The resulting continuous homogeneous coating of dyes and polymer was then overcoated with a charge transport solution consisting of 2:3 DEASP/M-60 polycarbonate in a 9:1 mixture of THF/toluene.

The resulting electrophotographic imaging element showed an $E_{150}^{870}$ of 1.17 microjoules/cm².

As described in the numerous foregoing examples, the present invention provides improvements over previously known methods of making electrophotographic imaging elements. It provides a simpler manufacturing process which avoids the preparation of the charge generation material in the form of particles in batches requiring long periods of grinding or milling. Additionally, it allows the preparation and use of an extremely thin charge generation layer, generally less than about 1.0 microns thick and as thin as about 50 Å. The charge generation layer once produced requires no additional treatment. Generally, the procedure provides charge generation materials which display good to high photosensitivity. No expensive binder materials are required in the preparation of the charge generation layer. Finally, the process can be easily sealed up, as no special grinding or milling equipment is required. As described, the charge generation material is dissolved in an organic primary amine containing solvent and coated by any suitable method onto a conductive substrate. A charge transport material layer is then applied in any number of ways.

The objects, advantages, and principles of this invention are broadly applicable and are not limited to the specific steps, methods, compositions or articles herein described. Other advantages and uses of this invention may be learned by experimentation with the invention and may require optimization for a given system without departing from the principles of the invention. In any event, it has been clearly shown that the use of organic primary amine containing solvent to dissolve charge generating photoconductive monoazo, disazo or squaric acid derivative dyes in the process of producing an electrophotographic imaging element is useful in providing such elements. While specific dyes and solvents have been disclosed, other charge generating photoconductive dyes and solvent systems for those dyes may be determined in accordance with the teaching of the present invention, and are considered to be fully equivalent with the monoazo, disazo, and squaric acid derivative dyes and the organic primary amine containing solvents taught herein.

While the invention has been particularly shown and described with reference to preferred embodiments thereof, it will be understood by those skilled in the art that various changes in form and details may be made therein without departing from the spirit and scope of the invention.

What is claimed is:

1. The process of manufacturing an electrophotographic imaging element including an electrically conductive substrate comprising the steps of:
   essentially completely dissolving organic primary amine soluble dyes capable of charge generations in a solvent which contains an organic primary amine as a portion of the solvent,
   said charge generating material selected from the group consisting of at least one organic primary amine soluble disazo and squaric acid derivative dye;
   said disazo dye having a formula

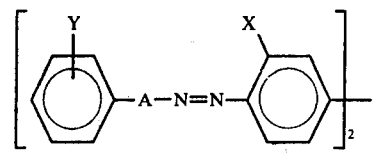

wherein A is selected from the group consisting of:

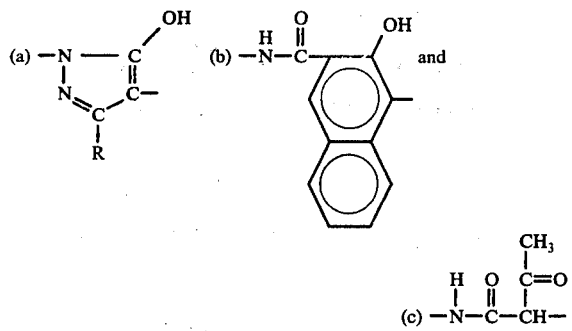

wherein R is selected from the group consisting of lower alkyl and

lower alkyl, and X and Y are each selected from the group consisting of: NO₂, CN, H, CH₃, OCH₃, OC₂H₅, OH, Cl, Br, and N(C₂H₅)₂
or wherein the said disazo dye has the formula

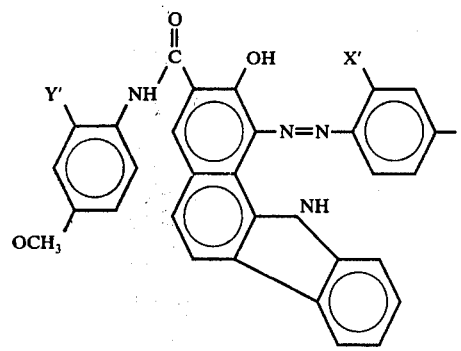

wherein Y' is H or CH₃ and X' is H or Cl.
and said derivatives of squaric acid include those having the formula

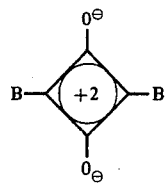

wherein B is selected from the group consisting of

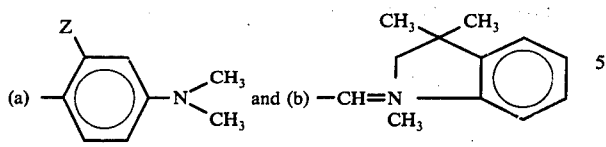

wherein Z is selected from the group consisting of H, OH and CH₃;

and then coating the resulting solution onto said conductive substrate.

2. The process of claim 1 wherein said dye layer is dried and then overcoated with a charge transport layer.

3. The process of claim 1 wherein the organic primary amine soluble dye is a disazo dye having a formula

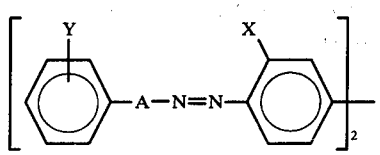

wherein A is selected from the group consisting of:

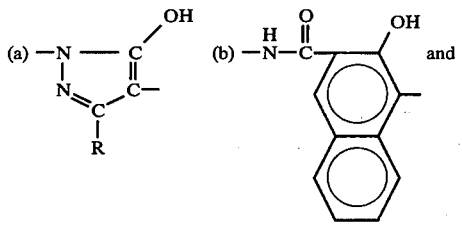

wherein R is selected from the group consisting of lower alkyl and

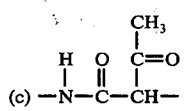

lower alkyl, and X and Y are each selected from the group consisting of: NO₂, CN, H, CH₃, OCH₃, OC₂H₅, OH, Cl, Br, and N(C₂H₅)₂; or wherein the said disazo dye has the formula

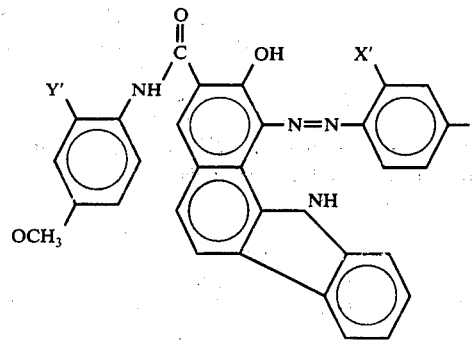

wherein Y' is H or CH₃ and X' is H or Cl.

4. The process of claim 3 wherein the disazo dye is chlorodiane blue.

5. The process of claim 4 wherein the organic primary amine containing solvent is tetrahydrofuran/ethylenediamine/n-butylamine in a ratio of about 30–60% by weight tetrahydrofuran, 10–40% by weight ethylenediamine and 10–40% by weight n-butylamine.

6. The process of claim 5 wherein the tetrahydrofuran/ethylenediamine/n-butylamine is in a ratio of about 55% by weight tetrahydrofuran, 25% by weight ethylenediamine and 20% by weight n-butylamine.

7. The process of claim 4 wherein said dye layer is dried and then overcoated with a charge transport layer.

8. The process of claim 7 wherein the charge transport layer includes a tri-aryl pyrazoline compound.

9. The process of claim 4 wherein an adhesive layer is coated on the conductive substrate prior to the coating of the charge generating dye solution.

10. The process of claim 9 wherein said dye layer is dried and then overcoated with a charge transport layer.

11. The process of claim 10 wherein the charge transport layer includes a tri-aryl pyrazoline compound.

12. The process of claim 1 wherein the organic primary amine soluble dye is a derivative of squaric acid having a formula

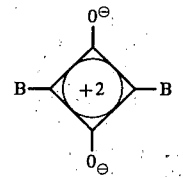

wherein B is selected from the group consisting of

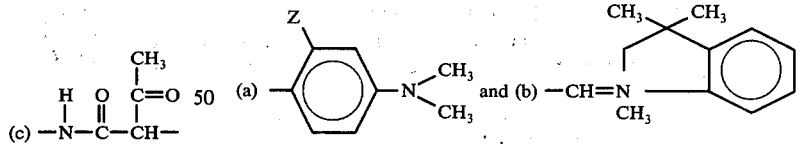

wherein Z is selected from the group consisting of H, OH and CH₃.

13. The process of claim 12 wherein the derivative of squaric acid is selected from the group consisting of methyl squarylium and hydroxy squarylium.

14. The process of claim 12 wherein said dye layer is dried and then overcoated with a charge transport layer.

15. The process of claim 13 wherein said dye layer is dried and then overcoated with a charge transport layer.

16. The process of claim 1 wherein a polymeric binder is present in said primary amine containing solvent along with said organic primary amine soluble dye.

17. The process of claim 1 wherein a charge transport material is present in said primary amine containing solvent along with said organic primary amine soluble dye.

18. The process of claim 2 wherein said charge transport layer is vacuum deposited.

* * * * *

UNITED STATES PATENT AND TRADEMARK OFFICE
CERTIFICATE OF CORRECTION

PATENT NO. : 4,123,270
DATED : October 31, 1978
INVENTOR(S) : Walter P. Heil; David B. Sclove It is certified that error appears in the above-identified patent and that said Letters Patent are hereby corrected as shown below:

Column 5, line 20, "structure" should read --structural--.

Column 6, line 18, "the" should read --that--.

Column 10, line 31, "term" should read --terms--.

Column 10, line 53, "(p-diethylaminostryryl)" should read --(p-diethylaminostyryl)--.

Column 11, line 6, Table I, "1.5 g/l" should read --1.5 g/ℓ--.

Column 11, line 7, Table I, "50 g/l" should read --50 g/ℓ--.

Column 11, line 8, Table I, "80 g/l" should read --80 g/ℓ--.

Column 11, line 9, Table I, ">10 g/l < 20 g/l" should read -->10 g/ℓ < 20 g/ℓ--.

Column 11, line 10, Table I, "75 g/l" should read --75 g/ℓ--.

Column 11, line 11, Table I, "5 g/l" should read --5 g/ℓ--.

Column 11, line 12, Table I, "180 g/l" should read --180 g/ℓ--.

Column 11, line 14, Table I, "Diethylenetraimine" should read --Diethylenetriamine--.

Column 14, line 45, Table III, Heading "av" should read --Δv--.

Column 14, line 49, Table III, ".63" should read --63--.

Column 15, line 31, Table IV, "0.4$" should read --0.43--.

Column 17, line 29, "a dye solution" should read --dye solution--.

Column 17, line 58, "tetraydrofuran" should read --tetrahydrofuran--.

UNITED STATES PATENT AND TRADEMARK OFFICE
CERTIFICATE OF CORRECTION

PATENT NO. : 4,123,270
DATED : October 31, 1978
INVENTOR(S) : Walter P. Heil; David B. Sclove It is certified that error appears in the above-identified patent and that said Letters Patent are hereby corrected as shown below:

Column 20, line 20, Table VI, Heading "DC-BA" should read --BA--.

Column 20, line 20, Table VI, Heading "200" should read --DC-200--.

Column 20, line 20, Table VI, Heading "Coat Binder" should read --Binder--.

Column 20, line 20, Table VI, Heading "Formed" should read --Coat Formed--.

Column 20, line 23, Table VI, "795-PE" should read --795-E--.

Signed and Sealed this

Third Day of April 1979

[SEAL]

Attest:

RUTH C. MASON
Attesting Officer

DONALD W. BANNER
Commissioner of Patents and Trademarks